Oct. 8, 1935.   W. D. MARCHANT ET AL   2,017,009
INJECTION APPARATUS FOR FUEL FOR INTERNAL COMBUSTION ENGINES
Filed Dec. 21, 1932   2 Sheets-Sheet 1
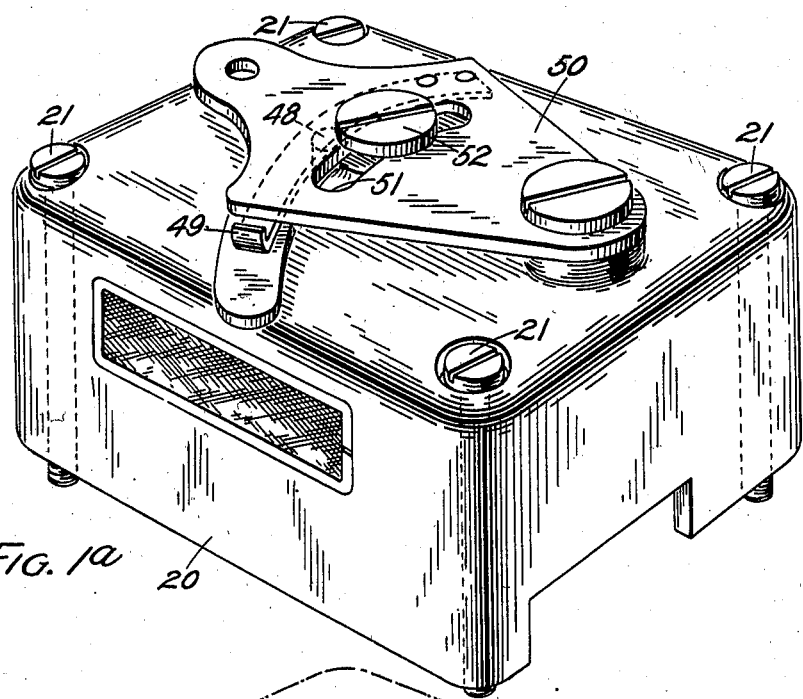
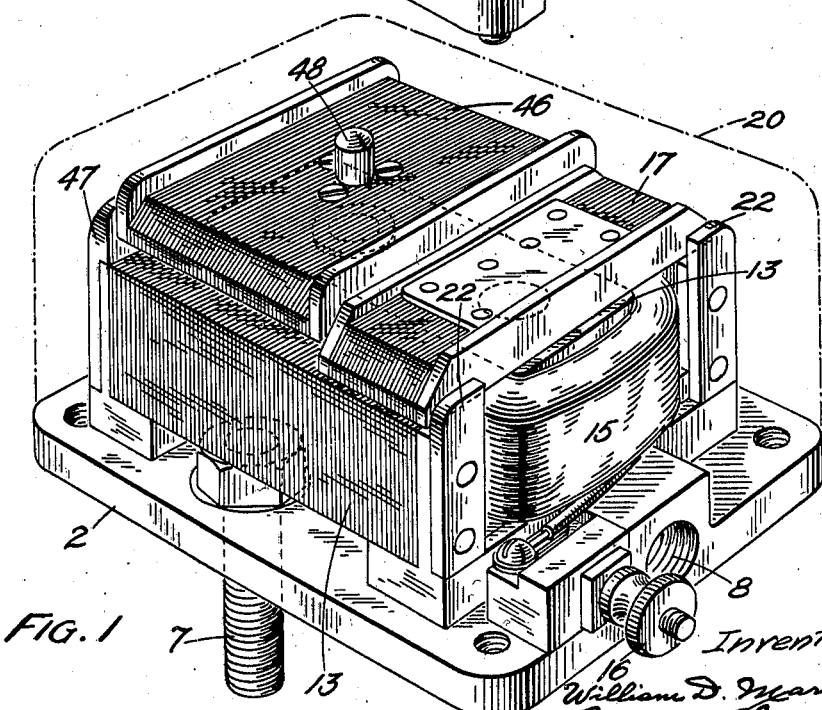

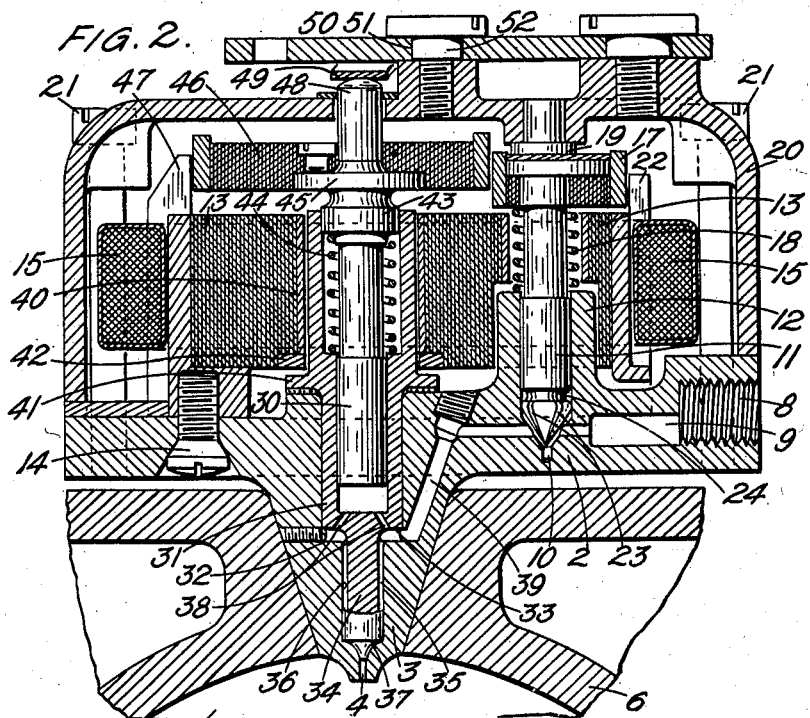
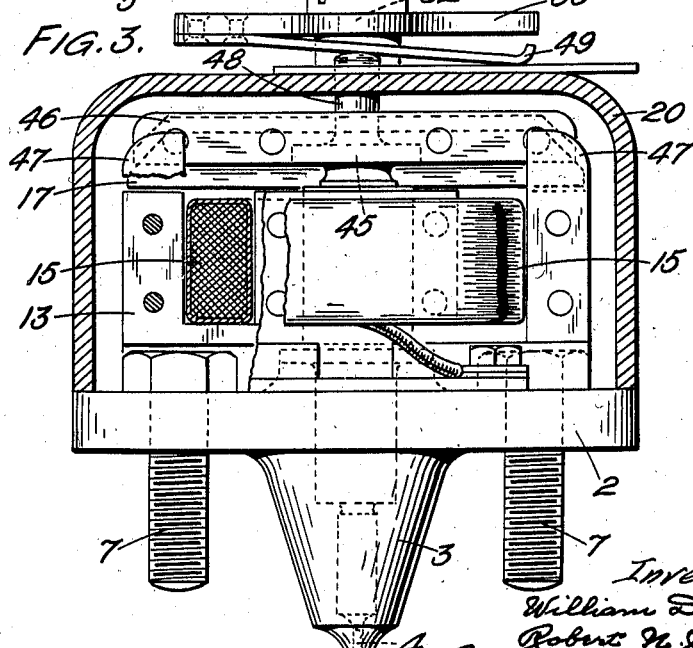

Patented Oct. 8, 1935

2,017,009

UNITED STATES PATENT OFFICE 2,017,009

INJECTION APPARATUS FOR FUEL FOR INTERNAL COMBUSTION ENGINES

William Douglas Marchant, Liege, Belgium, and Robert Neil Stewart, Kinlochmoidart, Glenfinnan, Scotland Application December 21, 1932, Serial No. 648,294
In Great Britain February 18, 1932

19 Claims. (Cl. 299—107.2)

This invention relates to fuel injection apparatus for internal combustion engines.

Injection apparatus as hitherto actually used on internal combustion engines has been mechanically operated, which presents several disadvantages both in manufacture and in operation.

The principle of mechanically operated pumps lies in the building up of pressure with the object of imparting high velocity to the fuel delivered to enable it to penetrate the combustion space. This building up of pressure must necessarily lead to overloading of all the working parts of the pump and the injector, thereby increasing the difficulties of manufacture.

Due to this method of building up pressure mechanically before injection, only the initial portion of the injection is relatively fast, because as soon as the injector valve opens, this pressure is released and the remaining portion of the injection can only be delivered at the piston velocity of the pump.

As the velocity of the piston is entirely dependent upon engine speed, the injection velocity of the smaller quantities of fuel injected during light load running conditions of the engine must necessarily be slower and in consequence the penetration is less causing incomplete combustion and hence poor running results.

Whilst it is possible to reduce the pressure employed by increasing the velocity of the pump piston, this increase of velocity presents almost insuperable difficulties if the problem is tackled by mechanical means. In addition, existing mechanical pumps require in theory approximately 25° of crankshaft rotation to effect the injection and fuel injection engines employing existing systems of pump and injector are limited in speed due to the fact that these injection systems are mechanically incapable of working at high speeds.

The objects of this invention are:—

(1) To provide means of injecting fuel with an ever increasing velocity throughout the period of injection with an extremely rapid cut-off for the termination of the injection.

(2) To provide an instrument which reduces to the minimum mechanical defects and allows a much wider range in manufacturing errors.

(3) To reduce to the lowest point the loading of all the moving parts, thereby providing an instrument with a much longer life than is at present obtainable. In this invention the oil pressure need be only slightly in excess of the maximum compression pressure in the engine cylinder.

(4) To provide a perfect control of quantity, the moment and duration of injection being devoid of any delicate adjustment.

(5) To provide an injection system allowing fuel injection engines to operate at greater speeds than with the existing systems.

(6) To provide a means of injection in which the velocity of injection is not dependent on engine speed.

Whilst a magnet or solenoid, or combination of a magnet and solenoid, may be employed for the operation of the device hereinafter described, the term "magnet" will be employed compendiously in this specification as meaning any, or a combination of any, of the elements above referred to.

Means may be employed for adjusting any or all of the following, namely, the moment of injection, the duration of injection and the quantity of the injection.

The moment of injection may be determined or altered by determining or altering the time at which the electric current is caused to flow. Any further variation may also be obtained by suitable arrangement of the associated supply or injector valves.

The duration of the injection may be determined or varied by one or more of the following methods; first, by varying the bore stroke ratio of the pump, secondly by determining or varying the size of the injector nozzle orifice and thirdly by determining or varying the intensity of the electro-magnet. An increase or decrease of current in the magnet windings may be produced for this purpose, this being possible while the engine is running. Fourthly, the duration of injection may be varied by altering the position of the armature relative to the magnet.

The quantity of injection may be determined or varied by any of the following methods; first, by varying the stroke of the pump, secondly by means of suitable control of the supply valve or thirdly, by a combination of these two methods.

One embodiment of the invention is illustrated by way of example, in the accompanying drawings, whereof:—

Fig. 1 is a perspective view of the apparatus with the cover removed,

Fig. 1ᵃ is a perspective view of the cover,

Fig. 2 is a longitudinal section, and

Fig. 3 is an end elevation, partly in section.

Referring to the drawings, the apparatus comprises a body 2 of cast iron provided with an extension 3 containing the injector nozzle orifice 4, which opens into the combustion chamber 5 of the cylinder 6. The body is secured by bolts 7 to the cylinder, suitable packing being interposed to ensure a tight joint. Both the pump and the injector valve are embodied in one unit, thereby avoiding a long pipe line from the pump to the injector.

In the body 2 is formed a fuel inlet 8 communicating with a passage 9 leading to a valve seating 10 for the supply valve 11, the latter comprising a stem slidably mounted in a boss 12 formed on the body 2 and having a tapered lower extremity to coact with the similarly shaped valve seating 10.

A laminated magnet 13 is secured by screws, such as 14, to the body 2 and is electrically excited by means of the windings 15 connected to the terminal 16 (Fig. 1).

The upper end of the supply valve 11 carries a draw-plate 17, which, upon the magnet's being excited, is drawn downwardly to close the supply valve 11 onto its seating in opposition to a return spring 18 located between the draw-plate 17 and the top of the boss 12. The draw-plate 17 is of laminated construction (as clearly shown in Fig. 1) and, when the current is switched off, occupies a position clear of the magnet due to the action of the return spring 18. In this position the supply valve 11 is open and the draw-plate is resting on a stop 19 carried by the cover 20, which is secured to the body 2 by screws 21. The stop 19 limits the upward movement of the draw-plate 17 in such a way as to keep it as close to the magnet as possible compatible with permitting the valve 11 to open sufficiently. The stop 19 may be made of fibre or some resilient material to act as a cushion for the return stroke of the draw-plate 17. Extensions 22 on the end of the magnet 13 serve to prevent the draw-plate 17 from turning.

The conical part of the supply valve 11 has formed therein several flutings 23 communicating with a circumferential groove 24, thereby ensuring that when the valve closes, fluid will not be trapped in the recess at the bottom of the seating, but will be permitted to escape into the groove 24 and thence back into the passage 9. It will be observed that no flutings are located on the valve opposite where the passage 39 joins the valve seating, whereas there are flutings on the valve opposite where the passage 9 joins the valve seating. It has been found with this construction that when the valve is suddenly closed, an additional pressure is built up in the passage 39 the purpose of which will be hereinafter explained.

The pump mechanism will now be described.

A piston 30 operates in a cylinder 31, which in turn is slidably mounted in a second cylinder 32 (hereinafter referred to as the "transfer cylinder") formed partly in the body 2 and partly in the extension 3 thereof. The lower surface 33 of the cylinder 31 constitutes a piston (hereinafter termed the "transfer piston") in the transfer cylinder 32.

The transfer piston 33 carries an extension of reduced diameter having a conical lower extremity, which forms the injector or outlet valve 34; the latter is fluted, as at 35, and operates with a comparatively loose fit in a bore 36 in the extension 3. The conical extremity of the injector valve coacts with the seating 37.

Communication is established between the cylinder 31 and the transfer cylinder 32 by means of the transfer ports 38. A passage 39 leads from the supply valve seating 10 to the transfer cylinder 32.

The cylinder 31 extends upwardly through a brass sleeve 40 fitted into the magnet 13 and is formed with a flange 41 adapted to contact with a washer 42 of fibre or like material let into the lower surface of the magnet for the purpose of limiting upward movement of the cylinder 31. It will be observed that the upper end of the latter projects slightly above the upper surface of the magnet 13.

The piston 30 is formed with a shoulder 43 to serve as an abutment for a return spring 44 located within the annular space between the upper part of the piston 30 and the cylinder 31, the latter being internally enlarged at this point.

A flange 45 on the upper end of the piston 30 serves for the attachment of a laminated draw-plate 46, prevented from rotating by the extensions 47 on the magnet 13.

A button 48 projecting from the draw-plate passes through a clearance hole in the cover 20 and contacts (while in its upward position) with an inclined spring 49 fixed to a quadrant 50 pivoted to the cover 20 and capable of being rocked about its pivot within the limits of the slot 51 and pin 52. According to the position of the spring 49 in relation to the button 48 depends the degree of return or upward movement permitted to the draw-plate and hence to the piston 30 under the action of the return spring 44. Moreover the spring 49, due to its flexibility, allows the button 48 to return momentarily beyond its final upward position for a purpose which will be later described.

The quadrant 50 may be coupled to any suitable control rod, whereby it may be rocked to regulate the stroke of the piston 30 and hence to regulate the quantity of injection.

In operation, the apparatus works as follows; the terminal 16 is connected to a contact maker, or equivalent device, whereby the magnet 13 may be excited in timed relationship with the engine crankshaft. The supply of current may suitably be derived from a 12 volt battery, normally charged by a dynamo driven from the engine, as in modern automobile practice.

A source of fuel supply is connected to the inlet 8 and fuel passes to the supply valve 11, which remains open until the magnet is excited. Eventually fuel completely fills the passage 39, the space round the injector valve 34 in the flutings, including the transfer cylinder 32, ports 38 and cylinder 31.

At the proper moment of injection, the contact maker excites the magnet resulting first of all in the supply valve 11 closing. The latter must be adapted to close before the piston 30 and transfer piston 33 come into operation to perform the injection (as will presently be described), as otherwise fuel would be forced back into the supply channel 9. The supply valve 11 closes first for the following reasons; it is of light weight as compared with the piston 30 and transfer piston 33, its return spring 18 is weaker than the return spring 44, the initial movement of the draw-plate 46 is taken up in displacing fuel and not in injecting and moreover the draw-plate 17 in its initial position is located very much closer to the magnet than is the case with the draw-plate 46.

As the supply valve 11 closes, a slight extra pressure is created in the passage 39 and hence in the cylinder 31 and transfer cylinder 32. This is due to the fact that there are no flutings in the conical face of the supply valve opposite the passage 39, so that as the valve seats, it has the effect of forcing fuel along that passage.

As the piston 30 starts to move, the fuel in the cylinder 31 is forced through the ports 38 into the transfer cylinder 32 and owing to the area of the transfer piston 33 exceeding that of the piston 30, the pressure created lifts the transfer piston 33 and hence the injector valve 34 off its seating; injection now commences. The cylinder 31 lifts until the flange 41 abuts on the fibre washer 42, the latter being so fitted or proportioned as to arrest the upward movement of the cylinder 31 after it has lifted the required amount. The lift permitted is of some importance as will be further described. Eventually the flange 45 on the descending piston 30 strikes the top of the cylinder 31 and forces it downwardly with ever increasing velocity due to the fact that the draw-plate 46 is approaching the magnet. As the cylinder 31, that is, the transfer piston 33, moves downwardly, injection is now effected during the final stage by the larger area of the transfer piston 33 at a high velocity and moreover at an ever increasing velocity.

As the injector valve 34 is integral with the transfer piston 33 it also travels down and finally seats, thus arresting injection cleanly and sharply. As the flange 45 of the piston 30 is at this moment resting upon the upper end of the cylinder 31, downward movement of the piston 30 is simultaneously arrested and this is arranged in such a way that the draw-plate 46 never touches the magnet 13.

Likewise it may be mentioned here that the draw-plate 17 is never allowed to touch the magnet.

It will be seen from the preceding paragraphs that the piston 30, upon starting its movement, raises the pressure of the fuel, applies pressure to the cylinder 31 and lifts same, together with the injector valve, off its seating. The piston moves with increasing velocity as the draw-plate approaches the magnet and the velocity of injection increases until the flange 45 strikes the top of the cylinder 31 whereupon the latter cylinder is converted into an additional piston—the transfer piston 33—which then proceeds to perform the final stage of the injection at a very much greater velocity, owing to its larger area. It should be noted that the velocity of injection keeps on increasing right up to the cut-off point, when it ceases cleanly and sharply, thereby avoiding any dribbling at the nozzle.

It has been mentioned above that the lift permitted to the cylinder 31 is of importance. In actual practice the lift may amount to $\frac{1}{16}$ of an inch.

By increasing the upward travel permitted to the cylinder 31, the time at which the piston 33 of larger area comes into action to effect the final stage of the injection started by the piston 30 is advanced, that is to say, due to the greater lifting of the cylinder 31, the latter is operated by the electromagnet at an earlier period in any one particular pumping stroke. It will be obvious that if the larger piston 33 comes into action at an earlier period during the pumping stroke, the period of the first stage of injection by the piston 30 will be decreased and the period of the final stage injection by the larger piston 33 will be increased, thereby increasing the mean velocity of the injection. It is therefore possible to control the velocity and character of the injection by controlling the lift permitted to the cylinder 31.

In order to avoid noise, the washer 42 may be formed of fibre or other resilient material to afford a cushioning effect on the upward stroke of the cylinder.

Mechanism may in fact be introduced for regulating this lift whilst the apparatus is in operation.

The quantity of the injection may be controlled by regulating the stroke of the piston 30, for example by lengthening or shortening its return stroke. This is effected, as above described, by rocking the quadrant 50 and altering the position of the spring 49 in relation to the button 48. Thus it will be seen that the quantity of injection is controlled by the stroke of the smaller piston 30, a more sensitive control being obtainable in this way due to its smaller area. On the other hand, high injection velocity in the final stage is obtained by means of the larger area of the transfer piston 33 and hence the mean velocity of injection is best controlled by regulating the lift permitted to the cylinder 31 and consequently the period in which it is operative to effect the final stage of injection, as above mentioned.

It has been stated above that, due to the flexibility of the spring 49, a yielding action is obtained on the return stroke of the piston 30; this allows the latter to return momentarily beyond its final upward position, thereby affording a negative pressure of appreciable intensity and greatly assisting in the reloading of the pipe line with fuel. A further advantage in permitting the piston 30 to yield on its return stroke is to enable the supply valve to effect a degree of supercharging. It has been shown above that when the supply valve closes a pressure is induced in the passage 39 and the supercharging effect is assisted by the above mentioned yielding action of the piston 30. The degree of supercharging can be controlled to some extent by the strength of the spring 49.

Whilst the supply valve 11 may be adapted to give any desired degree of supercharging it may, on the other hand, be adapted so as not to have any supercharging effect at all. It has been found that this valve may be so arranged as to give a supercharging effect sufficiently strong even to open the injector valve 34.

The initial pressure of injection may be determined or adjusted by determining or adjusting the strength of the piston return spring 44.

In order to make the apparatus deliver smaller quantities of fuel, the quadrant 50 is moved to restrict the return stroke of the piston 30 and it will be seen that the smaller the quantity to be injected, the greater will be the velocity at the nozzle, which is due to the fact that the draw-plate 46 is very much closer to the magnet when the device is set for delivering small quantities. Thus the apparatus affords the desirable feature of increasing the speed of injection as the quantity of fuel to be injected is reduced.

In most mechanically operated injection apparatus, the pistons move a constant distance, whereas in the present invention the movement of the piston varies according to requirements, or in other words, proportionally to the charge injected. In the present construction the total travel of the piston is employed in performing useful work, whereas in mechanically operated pumps about 80% of the piston travel is idle or wasted.

Whilst one embodiment of the invention has been illustrated in the drawings, various modifications may be made in the construction of this apparatus without departing from the spirit of the invention.

An injector made in accordance with this invention, possesses the following advantages; it is extremely accurate in metering the fuel at all quantities, it can provide a very rapid injection, ever increasing velocity of injection, much superior penetration of the air in the combustion space, permits much more latitude in nozzle design, thereby improving vapourisation, affords very rapid cut-off, avoids dribbling at the nozzle, and is simple and relatively cheap to manufacture. The construction moreover enables an excellent radiating surface to be obtained on the nozzle.

We claim:

1. In fuel injection apparatus for an internal combustion engine, the combination with a pump comprising a piston, an outlet valve, and a cylinder carrying the said outlet valve and co-operating with the said piston, such cylinder constituting a relatively large piston movable by fluid pressure exerted by the said first-mentioned piston to open the outlet valve, of electromagnetic means acting on the said relatively large piston to effect injection at increasing velocity and to positively close the said outlet valve to secure a sharp cut-off of the injection.

2. In fuel injection apparatus for an internal combustion engine, the combination with a pump comprising a piston, an outlet valve, a cylinder carrying the said outlet valve and co-operating with the said piston and movable by fluid pressure exerted by the said piston to open the outlet valve, and a supply valve for controlling the supply of fuel to the said pump, of electromagnetic means operating the said pump and also acting to positively close the said outlet valve to effect a sharp cut-off of the injection, and simultaneously energized electromagnetic means acting to close the said supply valve prior to the commencement of the injection.

3. Fuel injection apparatus for an internal combustion engine, including a pump comprising a relatively small piston and a relatively large piston, an electromagnet operating on the small piston, and a member movable with the small piston to engage the large piston whereby the final stage of injection is effected by the large piston under the influence of the electromagnet at greatly increased velocity.

4. In fuel injection apparatus for an internal combustion engine, the combination with an electromagnetically operated pump comprising a cylinder, and a piston having a projecting rod, of a pivotally mounted abutment member co-acting with the piston rod to determine the limit of the back stroke of said piston, and a control rod coupled to the said abutment member.

5. In fuel injection apparatus for an internal combustion engine, the combination with an electromagnetically operated pump comprising a cylinder, and a piston having a projecting rod, of a pivotally mounted abutment member for co-operation with the said piston rod to adjustably determine the limit of the back stroke of the said piston and to permit movement of the said piston beyond, and recovery of the said piston to, such limit and a control rod coupled to the said abutment member.

6. In fuel injection apparatus for an internal combustion engine, the combination with a pump and a fuel supply valve for controlling the admission of fuel thereto, of an electromagnet operating the said pump and effecting the closing of the said supply valve prior to the commencement of injection, and a spring element normally maintaining the said supply valve open.

7. Fuel injection apparatus for an internal combustion engine, including a pump and piston, a draw plate associated with the piston, an electromagnet co-operating with the said draw plate to effect the forward stroke of said piston, a return spring adapted to cause the return stroke of the said piston, a supply valve controlling the admission of fuel to the said pump, a spring effecting the opening movement of said supply valve, said spring being weaker than the return spring of the said piston, and a draw plate associated with the said supply valve and located nearer to the said electromagnet than the draw plate associated with the said piston in order that the electromagnet will act to close the said supply valve prior to the commencement of the injection.

8. In fuel injection apparatus for an internal combustion engine, the combination with a pump having a piston, an outlet valve, a relatively large piston carrying the outlet valve and movable to open the valve by fluid pressure created by the said pump piston, of electromagnetic means operating first on the pump piston to open the outlet valve and initiate the injection and then on the larger piston carrying the outlet valve to effect the final stage of injection at increased velocity.

9. In fuel injection apparatus for an internal combustion engine, the combination with a pump having a piston, an outlet valve, a relatively large piston carrying the outlet valve and movable to open the said valve by fluid pressure created by the said pump piston, and a supply valve controlling the supply of fuel to the said pump, of electromagnetic means operating first on the pump piston to open the outlet valve and initiate the injection and then on the larger piston carrying the outlet valve to effect the final stage of injection at increased velocity, and also acting on the supply valve to close the same prior to the commencement of injection, and a spring normally maintaining the supply valve open.

10. In fuel injection apparatus for an internal combustion engine, the combination with a pump having a piston, an outlet valve, a relatively large piston carrying the outlet valve and movable to open the valve by fluid pressure created by the said pump piston, of electromagnetic means operating first on the pump piston to open the outlet valve and initiate the injection and then on the larger piston carrying the outlet valve to effect the final stage of injection at increased velocity, a pivotally mounted abutment member limiting the back stroke of the pump piston, and a control rod connected to the pivotally mounted member.

11. In fuel injection apparatus for an internal combustion engine, the combination with a pump having a piston, an outlet valve, a relatively large piston carrying the outlet valve and movable to open the valve by fluid pressure created by the said pump piston, of electromagnetic means operating first on the pump piston to open the outlet valve and initiate the injection and then on the larger piston carrying the outlet valve to effect the final stage of injection at increased velocity, a pivotally mounted abutment member adjustably limiting the back stroke of the pump piston, and permitting movement of the pump piston beyond, and recovery of the pump piston to, the limit predetermined by the setting of the abutment member, and a control rod connected to the pivotally mounted abutment member.

12. In fuel injection apparatus for an internal combustion engine, the combination with a pump having a piston, an outlet valve, a relatively large piston carrying the outlet valve and movable to open the valve by fluid pressure created by the said pump piston, of a base member carrying the injection apparatus, a removable cover fixed to such base member, an extension of the pump piston projecting outwardly through the said cover, an abutment member pivoted externally to the said cover and co-operating with the extension of the pump piston to limit the return stroke thereof, and electromagnetic means operating first on the pump piston to open the outlet valve and initiate the injection and then on the larger piston carrying the outlet valve to effect the final stage of injection at increased velocity.

13. In fuel injection apparatus for an internal combustion engine, the combination with a pump having a piston, an outlet valve, a slidable cylinder co-operating with the piston and itself constituting a relatively large concentric piston which is movable to open the outlet valve by the fluid pressure exerted by the small piston, of an electromagnet surrounding the said concentric pistons, a draw plate mounted upon an extension of the small piston and arranged so that the electromagnet operates to effect the compression stroke of the small piston and so that, after the large piston has moved to open the outlet valve, the draw plate abuts against and moves the said large piston to effect the final stage of injection at increased velocity and to return the outlet valve positively to its seating.

14. In fuel injection apparatus for an internal combustion engine, the combination with a pump having a piston, an outlet valve, a relatively large piston carrying the outlet valve and movable to open the said valve by fluid pressure created by the said pump piston, of a pivotally mounted abutment member adjustably limiting the back stroke of the pump piston, and permitting movement of the pump piston beyond, and recovery of the pump piston to, the limit predetermined by the setting of the abutment member, a control rod connected to the pivotally mounted abutment member, a conical supply valve having flutings in its seating face at positions other than opposite the passage leading to the said pump, and electromagnetic means operating first on the pump piston to open the outlet valve and initiate the injection and then on the larger piston carrying the outlet valve to effect the final stage of injection at increased velocity, and also acting on the supply valve to close the same prior to the commencement of injection.

15. In fuel injection apparatus for an internal combustion engine, the combination with a pump having a piston, an outlet valve, a slidable cylinder cooperating with the piston and itself constituting a relatively large concentric piston which is movable to open the outlet valve by the fluid pressure exerted by the small piston, and a supply valve controlling the supply of fuel to the pump, of an electromagnet surrounding the said concentric pistons, a draw plate mounted upon an extension of the small piston and arranged so that the electromagnet operates to effect the compression stroke of the small piston and so that, after the large piston has moved to open the outlet valve, the draw plate abuts against and moves the said large piston to effect the final stage of injection at increased velocity and to return the outlet valve positively to its seating, and a second draw plate connected to the said supply valve and normally disposed nearer to the electromagnet than the draw plate associated with the said piston so that the supply valve is closed by the electromagnet prior to the commencement of injection.

16. In fuel injection apparatus for an internal combustion engine, the combination with a pump having a piston, an outlet valve, a slidable cylinder co-operating with the piston and itself constituting a relatively large concentric piston which is movable to open the outlet valve by the fluid pressure exerted by the small piston, and a supply valve controlling the supply of fuel to the pump, of an electromagnet surrounding the said concentric pistons, a draw plate mounted upon an extension of the small piston and arranged so that the electromagnet operates to effect the compression stroke of the small piston and so that, after the large piston has moved to open the outlet valve, the draw plate abuts against and moves the said large piston to effect the final stage of injection at increased velocity and to return the outlet valve positively to its seating, a return spring cooperating with the said small piston, a second draw plate connected to the said supply valve and normally disposed nearer to the electromagnet than the draw plate associated with the said piston so that the supply valve is closed by the electromagnet prior to the commencement of injection, and a spring normally maintaining the said supply valve open, such spring being weaker than the said return spring co-operating with the small piston.

17. Fuel injection apparatus for an internal combustion engine, including a pump, and an outlet valve from the pump in conjunction therewith in combination with a fuel supply valve controlling the supply of fuel to said pump and a single electromagnet both to operate said pump and control said supply valve.

18. Fuel injection apparatus for an internal combustion engine, including a pump, and an outlet valve in conjunction therewith in combination with a fuel supply valve controlling the supply of fuel to said pump, a spring to keep the supply valve normally open and a single electromagnet both to control said supply valve and to operate the pump.

19. Fuel injection apparatus for an internal combustion engine, including a casing, a pump, and an outlet valve from the pump in conjunction therewith in combination with a fuel supply valve, a spring to normally keep said supply valve open, a heavier spring to draw back the pump and electromagnetic means to operate the pump and to close the supply valve.

WILLIAM DOUGLAS MARCHANT.
ROBERT NEIL STEWART.